(12) United States Patent
Amberg

(10) Patent No.: US 8,453,965 B2
(45) Date of Patent: *Jun. 4, 2013

(54) DOUBLE HOOK DOOR MECHANISM

(75) Inventor: Steve Amberg, Toronto (CA)

(73) Assignee: Messier-Dowty Inc., Ajax, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,134

(22) Filed: Jun. 27, 2012

(65) Prior Publication Data

US 2012/0292443 A1 Nov. 22, 2012

Related U.S. Application Data

(63) Continuation of application No. 12/630,507, filed on Dec. 3, 2009, now Pat. No. 8,231,078.

(60) Provisional application No. 61/193,530, filed on Dec. 5, 2008.

(51) Int. Cl.
*B64C 25/10* (2006.01)
(52) U.S. Cl.
USPC .............. 244/102 A; 244/102 R; 244/129.5
(58) Field of Classification Search
None
See application file for complete search history.

(56) References Cited

U.S. PATENT DOCUMENTS

| 2,567,114 | A | * | 9/1951 | Linn | 244/102 SL |
|---|---|---|---|---|---|
| 2,630,990 | A | * | 3/1953 | Lindquist et al. | 244/102 SL |
| 2,661,171 | A | * | 12/1953 | Allen | 244/102 SL |
| 2,668,031 | A |  | 2/1954 | Martin et al. |  |
| 2,670,156 | A |  | 2/1954 | Clark et al. |  |
| 2,937,541 | A | * | 5/1960 | Barlow | 74/532 |
| 3,652,039 | A |  | 3/1972 | Lucien |  |
| 3,669,387 | A |  | 6/1972 | Lucien |  |
| 5,482,228 | A | * | 1/1996 | Hoshino | 244/50 |
| 6,027,070 | A | * | 2/2000 | Zambelli | 244/102 R |
| 6,345,786 | B1 | * | 2/2002 | Sakurai | 244/102 R |
| 6,352,221 | B1 | * | 3/2002 | Sakurai | 244/102 R |
| 6,811,118 | B2 |  | 11/2004 | Collet et al. |  |
| 6,938,416 | B1 | * | 9/2005 | Kutlucinar | 60/528 |
| 8,231,078 | B2 | * | 7/2012 | Amberg | 244/102 A |
| 2003/0164422 | A1 | * | 9/2003 | Collet et al. | 244/102 R |
| 2008/0035793 | A1 | * | 2/2008 | Obst | 244/129.5 |
| 2009/0283634 | A1 | * | 11/2009 | Tran | 244/102 A |
| 2010/0140395 | A1 | * | 6/2010 | Amberg | 244/102 R |
| 2011/0024557 | A1 | * | 2/2011 | Brighton et al. | 244/102 SL |

OTHER PUBLICATIONS

International Search Report and Written Opinion issued by the Canadian Intellectual Property Office dated Feb. 26, 2012 relating to corresponding International Application No. PCT/CA2009/001754.
International Preliminary Report on Patentability issued by the International Bureau of WIPO dated Jun. 7, 2011 relating to corresponding International Application No. PCT/CA20091001754.

\* cited by examiner

*Primary Examiner* — Christopher P Ellis
*Assistant Examiner* — Medhat Badawi
(74) *Attorney, Agent, or Firm* — Aaron Edgar; Gowling Lafleur Henderson LLP

(57) ABSTRACT

The present invention provides a double hook door mechanism for use in opening and closing aircraft landing gear bay doors.

13 Claims, 6 Drawing Sheets

DOUBLE HOOK DOOR MECHANISM

CROSS-REFERENCE TO RELATED APPLICATIONS

This application is a continuation of application Ser. No. 12/630,507, filed Dec. 3, 2009 which claims the benefit of Provisional Application No. 61/193,530, filed Dec. 5, 2008, all of which are incorporated by reference herein in their entirety.

FIELD OF THE INVENTION

The present invention relates to a door mechanism used to open and close aircraft landing gear doors. In particular the present invention relates to a double hook door mechanism for use in opening and closing aircraft landing gear doors.

BACKGROUND OF THE INVENTION

Landing gear doors, located on aircraft, are configured to open and close to allow for the raising and lowering of landing gear during take off and landing. To date, either independent actuators or a series of linkages or a hook that is mounted on the landing gear doors have been used to operate the opening of the landing gear doors.

When independent actuators are used they are generally mounted on the forward bulkhead of the landing gear bay and will allow the landing gear doors to be opened and closed when the nose landing gear is raised and lowered. However, the increased weight of the actuators and the associated equipment that is used can cause a problem dues to the added weight and complexity of the equipment which can be unacceptable in the aircraft system. In addition, there is a general desire to move away from the use of hydraulic components within the industry.

Alternatively, a series of linkages may be used that are driven by the main fitting or drag brace. However, such use can be difficult to design and is not always available as an option for all landing gear. In addition, the use of such linkages does not allow the landing gear doors to be closed when the landing gear is extended and therefore can significantly decrease the aerodynamics of the aircraft.

The use of a hook on the door of the landing gear bay requires very large and expensive springs to keep the door in place. In addition, the use of hooks does not generally allow the doors to be closed when the landing gear is extended which, as mentioned above, will be detrimental to the aerodynamics of the aircraft.

It is therefore desirable to provide a mechanism that allows the landing gear doors to be opened and closed without sacrificing the aerodynamics of the aircraft and without requiring the use of expensive components.

SUMMARY OF THE INVENTION

In one aspect, the present invention provides a door mechanism, for use in opening and closing aircraft landing gear doors, which does not sacrifice the aerodynamics of the aircraft.

In another aspect, the present invention provides a double hook door mechanism, for use in opening and closing aircraft landing gear doors.

In one embodiment the present invention provides a double hook door mechanism that includes two hooks that are configured to act in tandem with each other and to rotate in opposing directions to each other. The first hook being configured to close the doors as the landing gear is retracted into the landing gear bay and the second hook being configured to re-close the doors as the landing gear extends.

There is also provided a door mechanism for use on an aircraft landing gear door comprising first and second hooks configured to operate in tandem with each other and to rotate in opposing directions, the hooks being configured to open and close the landing gear door as the landing gear extends and retracts. The first hook is configured to close the landing gear door when the landing gear is retracted and the second hook is configured to re-close the doors as the landing gear extends.

There is also provided an aircraft landing gear assembly comprising landing gear, moveable between a retracted and an extended position, including an upper drag brace having a projection extending therefrom; a landing gear bay configured to receive the landing gear when it is in the retracted position, the landing gear bay comprising a plurality of doors moveable between open positions and closed positions; a plurality of door mechanisms, each door mechanism connected to a respective door, each door mechanism comprising at least two hook portions connected to each other and configured to simultaneously rotate in opposing directions, rotation of the hook portions being effective to open and close the doors, each hook portion configured to releasably connect with the projection on the landing gear while the landing gear is moving between the extended and retracted positions; the movement of the landing gear initiating contact of the projection with one of the hook portions which causes the hook portion to rotate.

There is also provided a door mechanism for use on an aircraft landing gear bay door, the landing gear including an upper drag brace having a projection extending therefrom, the door mechanism comprising a first hook connected to the aircraft airframe at a first connection point and configured to rotate about the first connection point; and a second hook connected to the first hook and connected to the aircraft airframe at a second connection point and configured to rotate about the second connection point, one of the first and second hooks being connected to the door wherein the first and second hooks are configured to simultaneously rotate in opposing directions wherein rotation in a first configuration opens the landing gear door and rotation in a second configuration closes the landing gear door.

In one embodiment the first and second hook are connected to each other by a rod and the second hook is connected to the door. In another embodiment the first hook is connected to a biasing means that applies a force on the first hook in a first direction. In another embodiment, each of the first and second hooks are configured to releasably connect with the projection on the upper drag brace There is also provided a device for opening and closing a landing gear bay door comprising a door rod coupled to the landing gear bay door at a first end; a first connector, pivotably coupled to the landing bay at a first connection point and biased to pivot about the first connection point in a first direction; a second connector, pivotably coupled to the landing bay at a second connection point and coupled to the door rod at its second end; the first and second connectors coupled to each other and configured to simultaneously rotate in opposing directions, the first and second connectors configured to independently engage with a projection located on the landing gear, engagement of one of the first and second connectors with the projection causing rotation of the connectors which translates to movement of the door rod to open or close the bay door.

BRIEF DESCRIPTION OF THE DRAWINGS

The present invention will be described in further detail below with reference to the accompanying drawings in which.

DETAILED DESCRIPTION OF THE PREFERRED EMBODIMENTS

The present invention provides a double hook door mechanism for use in aircraft landing gear doors that efficiently opens and closes the doors while maintaining the aerodynamics of the aircraft.

The double hook door mechanism of the present invention includes the use of two hooks that act together to open and close the landing gear doors. It will be understood that the description provided herein relates to one of the doors of the landing gear bay and one door mechanism that is connected to that door. However, it will be known to a person skilled in the art that generally landing gear bays include two doors and therefore will include two door mechanisms, one for each door. It will further be understood that the left hand side door mechanism is illustrated and described herein. The right hand door mechanism will have the opposite configuration.

The double hook door mechanism of the present invention includes two hooks that each rotate about an axes that is perpendicular to the axes of rotation of traditional mechanisms used in the field. The double hook door mechanism of the present invention is easier to configure and also allows re-closing of the door which is typically not possible.

The present invention provides a double hook door mechanism that includes two hooks that are configured to act in tandem to open and close the aircraft landing gear doors. The hooks are configured to rotate in opposing directions and apply a force on the landing gear doors when required to open or close them. In addition, the double hook door mechanism is operable to maintain the doors in an open position to allow the landing gear to extend out of the landing gear bay and then close the landing gear doors to allow the aerodynamics of the aircraft to be maintained.

The double hook door mechanism of the present invention will now be described in further detail with reference to FIGS. 1-7.

Figure 1:
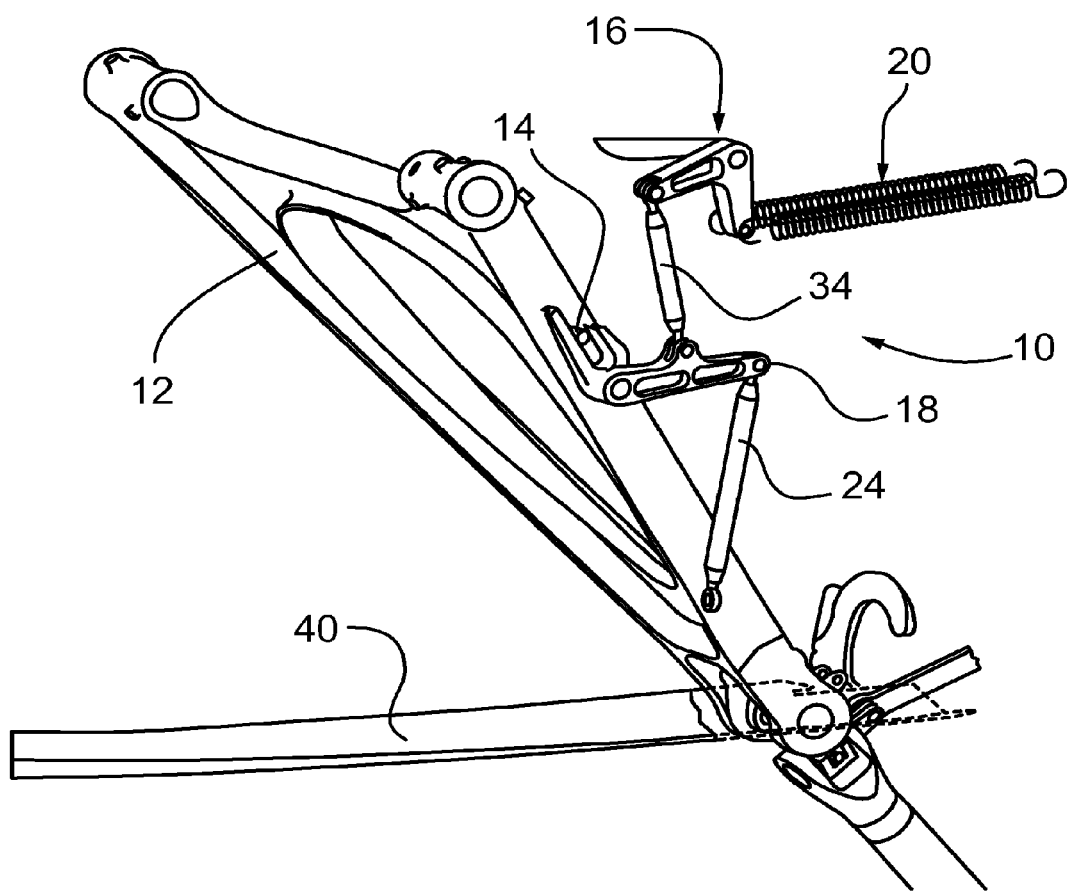
FIG. 1 illustrates one embodiment of the double hook door mechanism of the present invention.

FIG. 1 shows a portion of the landing gear, and in particular the upper drag brace, with the double hook door mechanism shown in the foreground, and indicated generally at 10.

It will be understood that the double hook door mechanism is shown in the Figures in use on a nose landing gear that is contained within a landing gear bay having a door that opens and closes. However, it will be understood that the double hook door mechanism is not limited to use with the specific landing gear that is illustrated. The double hook door mechanism of the present invention may be used in combination with any landing gear provided that it is able to operate as described herein. In addition, it will be understood by a person skilled in the art that existing landing gears and landing gear bays may be retrofitted to include the double hook door mechanism of the present invention, as described further below.

As can be seen in the Figures, the upper brace of the landing gear, indicated at 12, includes extending out of one side, a projection 14. The projection is also referred to herein as a roller. The projection 14 extends out of the side of the upper drag brace 12 a sufficient distance to be operable to connect with portions of the double hook door mechanism 10, as described in further detail below, to allow for operation of the double hook door mechanism 10. The projection 14 will move or rotate with the movement of the upper drag brace 12. In addition, the projection 14 is operable to rotate about its own axis separately from the upper drag brace 12.

The projection 14 may be made from any material that is suitable to withstand the environment within which it is contained and sustain the wear from the contact with the hooks, described below. For example the material must be able to withstand a range of temperatures which the landing gear bay may be exposed to. The projection 14 may be made from a standard roller or it may be built up from detailed parts. Preferably the projection 14 is made from stainless steel. The projection 14 is sized and shaped to be received by the hooks, described further below, of the double hook door mechanism 10. In addition, the projection 14 must be able to withstand the hook contact load and the shear loads.

The double hook door mechanism 10, shown clearly in FIGS. 1 through 7, includes two hooks, or connectors, an upper hook 16 and a lower hook 18. The upper and lower hooks 16, 18 are configured to be able to receive the projection 14 within each hook to allow for separate movement and rotation of each hook, about the projection 14. It will be understood that the upper and lower hooks may be the same size and shape or may differ, provided that they are able to function as described herein. The upper hook 16 is operable to close the landing gear doors when the landing gear is retracted into the landing gear bay. The lower hook 18 is operable to re-close the doors as the landing gear extends. The upper and lower hooks 16, 18, and their use, will be described in further detail below.

Figure 3:
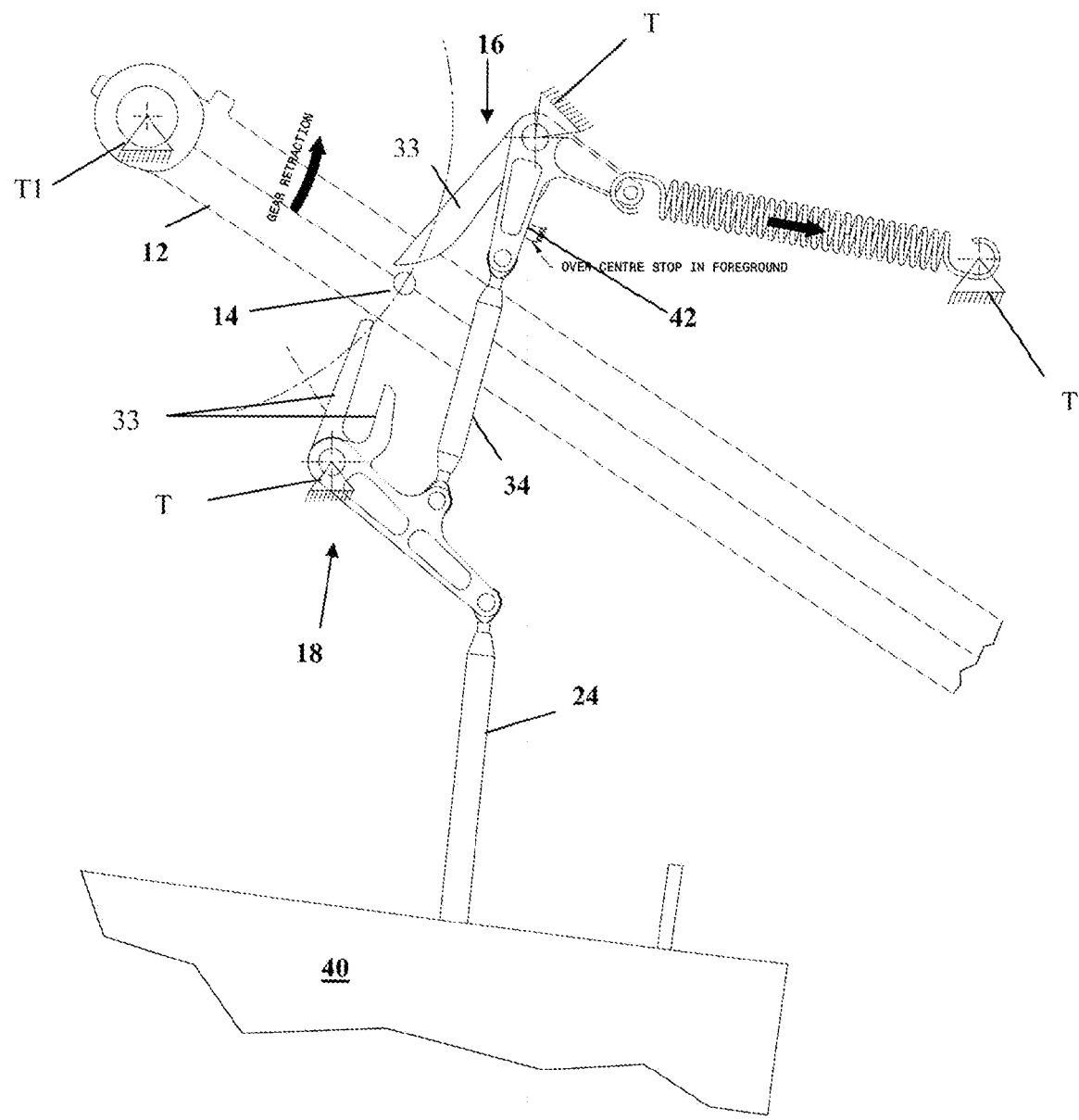
FIG. 3 is a schematic of one embodiment of the double hook door mechanism of the present invention showing the landing gear retracting.

The illustrated double hook door mechanism 10 is connected to the airframe, or landing gear bay, in three places, indicated generally by triangles, identified at numeral T in FIG. 3. It will be understood that the upper drag brace 12 is also connected to the airframe at triangle T1, indicated in FIG. 3. It will be understood that the attachment of the double hook door mechanism 10 and the upper drag brace 12 to the airframe may be secured by any means known in the art.

The double hook door mechanism 10 includes a biasing means, or spring(s) 20, which provide a door opening moment to force the landing gear bay doors open and to keep the doors open against an over-centre stop, indicated in FIG. 3 and discussed further below, when the landing gear is in transit between the gear up and gear down positions. It will be understood that one or more springs may be used in this position. In a preferred embodiment, two springs are used for redundancy, however the present invention is not limited to the use of two springs.

At the opposite end of the double hook door mechanism 10 a door rod 24 connects the door mechanism 10 to the bay door of the landing gear. At the opposite end the door rod 24 is connected to one end of the lower hook 18. The connection of the door rod 24 to the bay door allows the door mechanism 10 to open and close the bay door. The specific connection of the door rod to the bay door is not shown, however the door rod 24 can be attached to the bay door using a spherical bearing with a bolt and nut. It will be understood that the connection of the door rod 24 to the bay door is not limited to this type of connection, and any other connection may be used that will be known to a person skilled in the art.

The door rod 24 is pivotably connected to the lower hook 18. The connection may be made as described above using a spherical bearing with a bolt and nut. However, as described above, the connection is not limited to this and other means may be used as will be known to a person skilled in the art.

Turning to the upper and lower hooks 16, 18 clearly shown in the Figures, both hooks are shaped to be able to connect with projection 14 and to rotate relative to the projection 14. Both hooks 16, 18 include a body portion, upper hook body 26 and lower hook body 28 that each have projecting hook portions, upper hook portion 30 and lower hook portion 32 that extend away from the upper and lower hook bodies 26, 28 respectively. Each of the upper and lower hook portions 30, 32 are sized and shaped to connect with the projection 14, as described further below.

Both the upper hook portion 30 and the lower hook portion 32 include two arms, indicated at numeral 33, that form the hook shape. The upper hook portion 30 is shown with only one arm since the other is located behind the upper hook body 26 in the Figures. The upper hook body 26 is connected to the upper hook body 26 at position A. Likewise lower hook portion 32 is connected to lower hook body 28 at position B.

The two arms 33 located on each of the hook portions form a recess between them. The second, and smaller arm, on each hook portion allows the projection 14, or roller, to hit the second arm and force the lower and upper hook to move if any ice build-up has seized the mechanism. It will be understood that during normal operating conditions the second arm will not be used. It will be understood that other shapes and forms may be used for the upper and lower hooks 16, 18, and in particular for the upper and lower hook portions 30,32 and arms 33, provided that these components still function, as described herein, and are configured to connect with projection 14.

Connecting the upper hook 16 to the lower hook 18 is a linkage rod 34. The linkage rod 34 connects the two hooks 16, 18 so that they are configured to act in tandem and are further configured to rotate in opposite directions. In addition, the linkage rod 34 is configured to transfer load from the upper hook 16 through the lower hook 18 to the door rod 24. The door rod 24, in turn, transfers the load to the door to which it is connected so that the door may be opened or alternatively closed when no load is applied. In a preferred embodiment, the linkage rod 34 is connected to each end of the upper and lower hooks 16, 18 using two bolts and nuts. However, it will be understood that the connection of these parts may be made by any means known in the art and is not limited to this embodiment.

Figure 4:
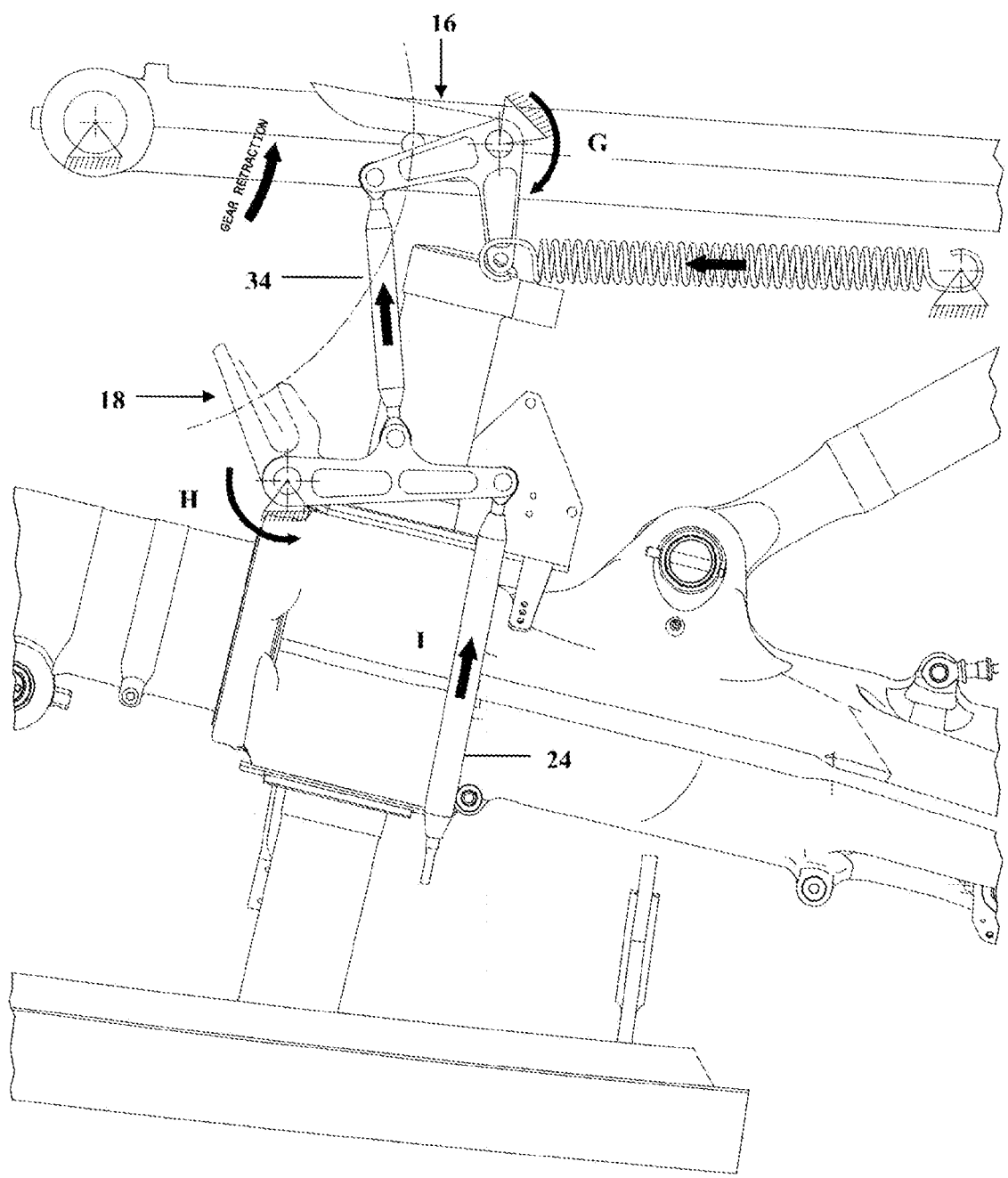
FIG. 4 is a schematic of one embodiment of the double hook door mechanism of the present invention shown with the gears refracted.

The operation of the double hook door mechanism of the present invention will now be described in further detail with reference to the Figures, and in particular FIGS. 2-4. As stated above the Figures illustrate a nose landing gear and show the left hand door of the nose landing gear bay. As described above, the right hand door will include a door mechanism that has the opposite configuration from the one described and depicted in the Figures.

Figure 2:
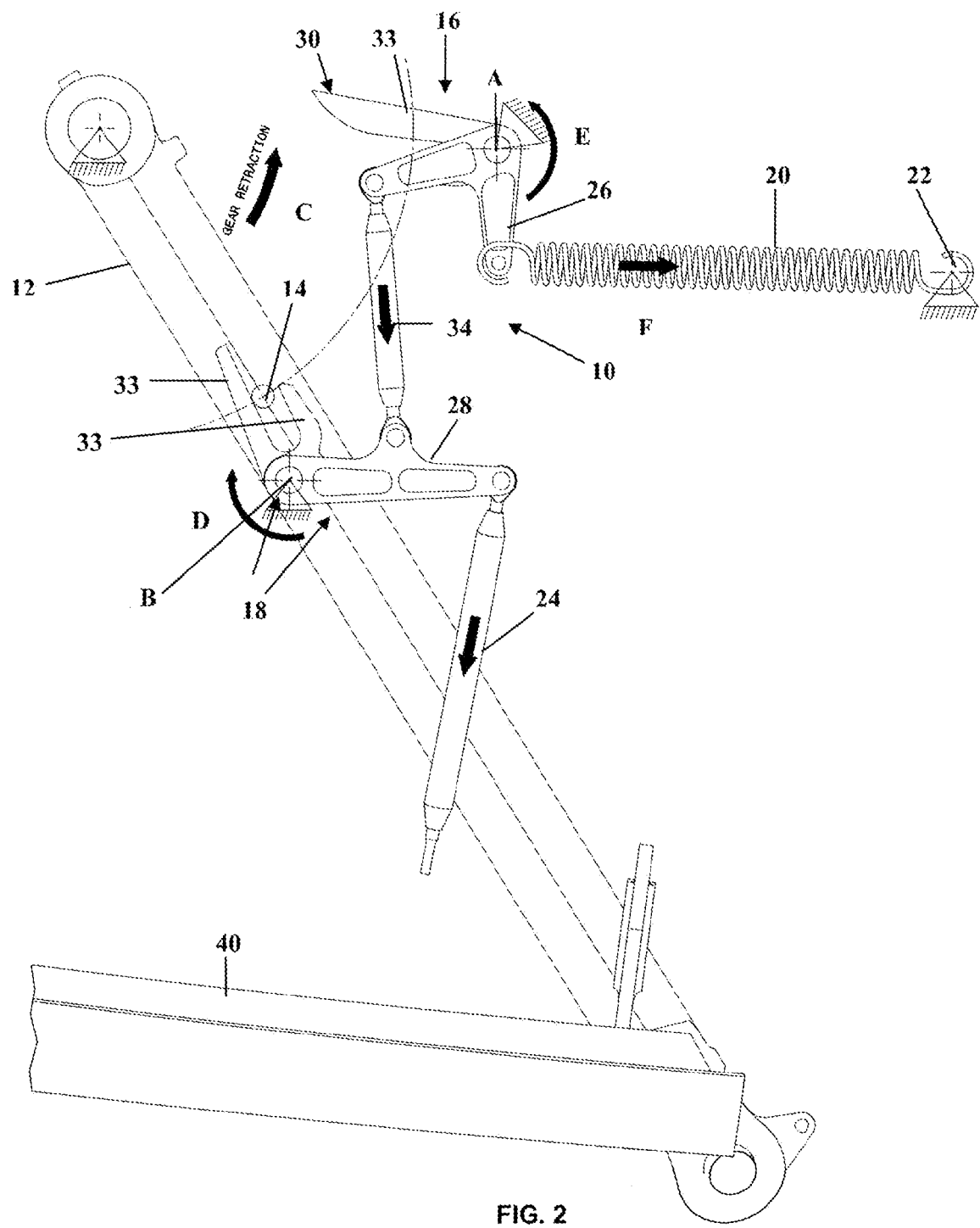
FIG. 2 is a schematic of one embodiment of the double hook door mechanism of the present invention shown with the landing gear extended.
Figure 5:
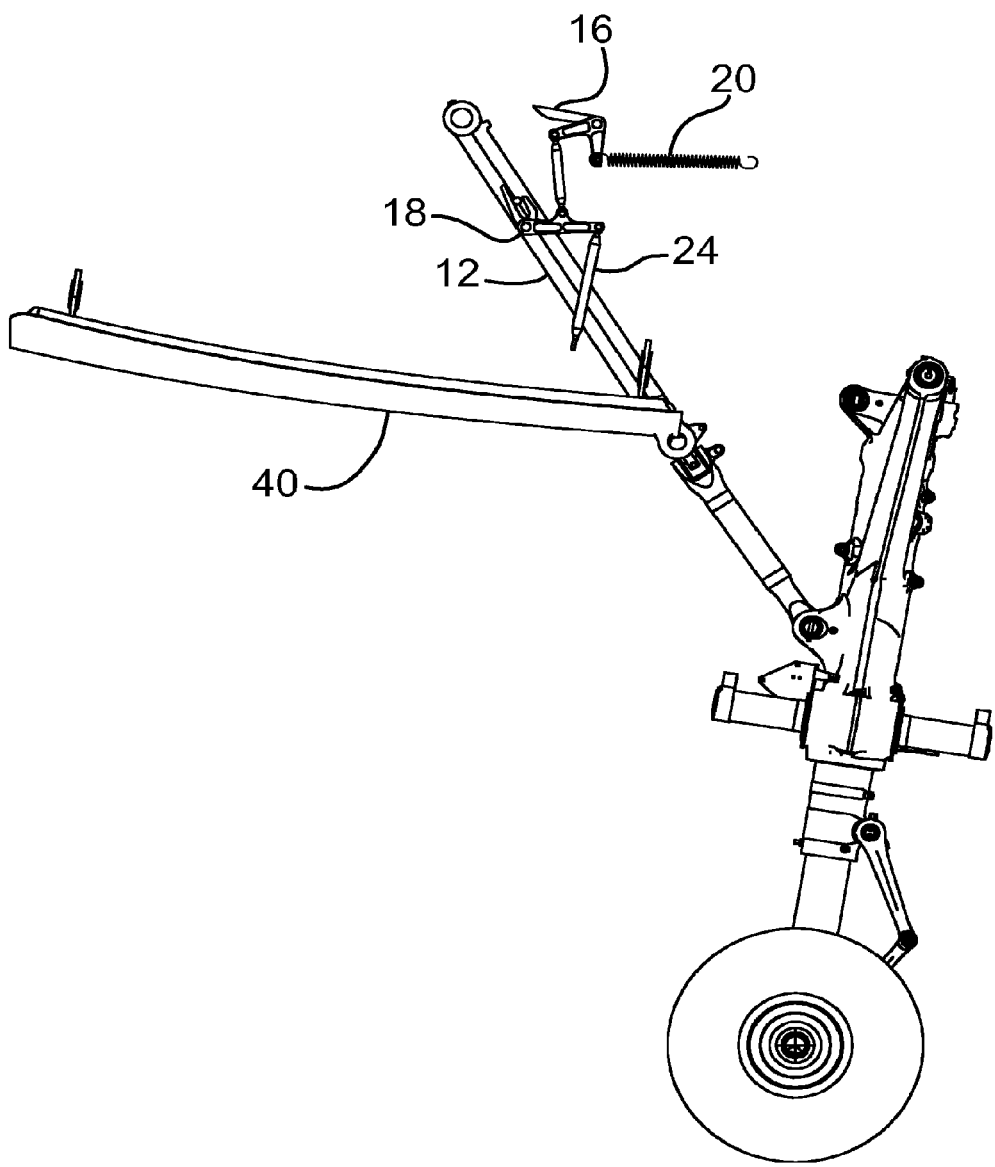
FIG. 5 is a schematic of the double hook door mechanism of FIG. 2 showing the landing gear bay and a portion of the aircraft.
Figure 6:
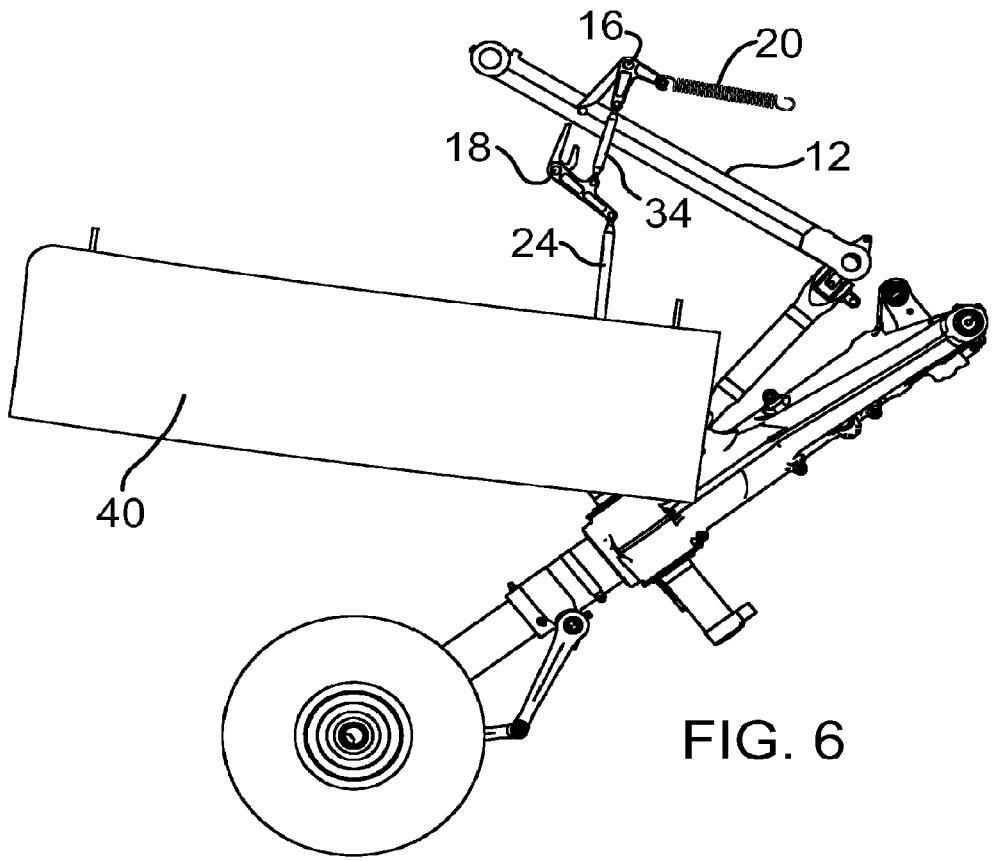
FIG. 6 is a schematic of the double hook door mechanism of FIG. 3 showing the landing gear bay and a portion of the aircraft.
Figure 7:
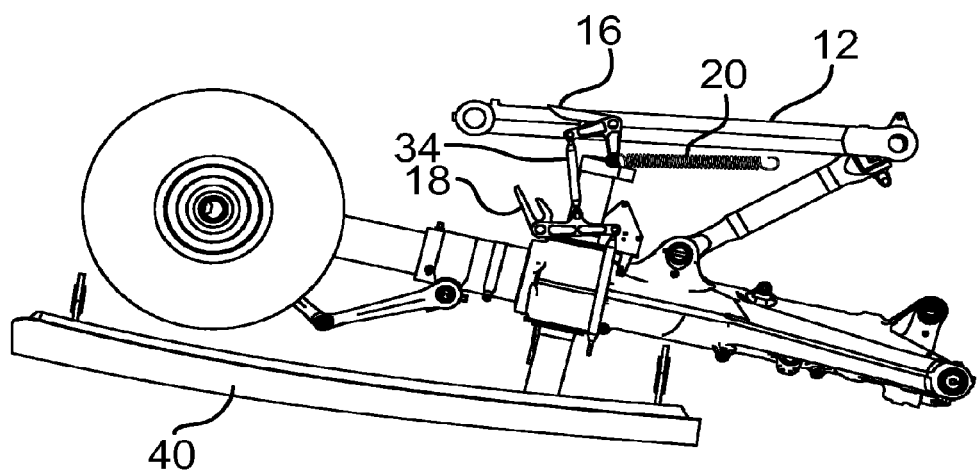
FIG. 7 is a schematic of the double hook door mechanism of FIG. 4 showing the landing gear bay and a portion of the aircraft.

Initially when the landing gear is down, and the upper drag brace 12 is in the extended position, shown in FIG. 2, the door is held closed. Numeral 40 indicates the closed door. FIGS. 5-7 show the same positions of the landing gear and the double hook door mechanism as FIGS. 2-4 however they include the door of the landing gear bay and a full view of the landing gear position relative to the landing gear bay.

As can be seen in FIG. 2, the door 40 is held closed due to the contact of the projection 14 on the lower hook 18 and in particular on the lower hook portion 32.

As the landing gear begins to retract the upper drag brace including the projection 14 begins to rotate counter-clockwise, as indicated at arrow C in FIG. 2. By way of this rotation, the projection 14 begins to move out of the way of lower hook 18. The force of the springs 20 act on the upper hook 16 to pull in the direction of arrow F. The force of the spring 20 will pull at the connection point to upper hook 16 and will thereby force rotation of the upper hook 16 in a counter clockwise direction, as indicated by arrow E. Once the projection 14 begins to move out of the way of the lower hook 18 the lower hook 18 is free to rotate. The force of the spring pulling the upper hook 16 in a counter clockwise rotation will in turn translate to a force pushing down on the linkage rod 34 which, in turn, forces the lower hook 18 to rotate in a clockwise direction once it is free of the projection 14. This rotation will transfer a load through the door rod 24 towards the door and the door will open, as shown in FIG. 3.

As the upper drag brace 12 and projection 14 continue to rotate in a counter clockwise direction, seen in FIG. 3, a position is reached at which the projection 14 is no longer contacting the lower hook and has not yet contacted the upper hook, i.e. it is free of the upper and lower hooks 16, 18. At this point, the force of the springs 20 pulling the upper hook 16 in a counter clockwise rotation will cause it to rest on the over-centre stop 42 indicated in FIG. 3. At this position the doors are open and the over-centre stop 42 and the force of the springs 20 will keep the doors from fluttering. It will be understood by a person skilled in the art that the over-centre stop 42 is connected to the airframe.

In this position, there is no connection between the double hook door mechanism 10 and the landing gear since neither of the upper or lower hooks 16, 18 are connected to or abutting against the projection 14.

As the landing gear retracts into the landing gear bay the upper drag brace 12 and the projection 14 will continue to rotate counter clockwise. This movement will eventually cause the projection 14 to come into contact with the upper hook 16. When the projection 14 comes into contact with the upper hook 16 the continued counter clockwise movement of the upper drag brace 12 and projection 14 will cause the upper hook 16 to begin to rotate clockwise, as indicated at arrow G in FIG. 4. This movement in turn will pull up the linkage rod 34 and in turn will cause the lower hook 18 to rotate in a counter clockwise direction, as indicated at arrow H in FIG. 4. The counter clockwise rotation of the lower hook 18 will pull the door rod 24 up, in the direction of arrow I in FIG. 4 and in turn will pull the doors closed. In addition, the clockwise rotation of the upper hook 16 will stretch the springs 20 in the direction of arrow J in FIG. 4.

At this point, the landing gear is in a fully retracted position within the landing gear bay and the bay doors are closed, as shown in FIG. 7.

When the landing gear is to be lowered the upper drag brace including the projection will begin to extend and to rotate in a clockwise direction and the events described above will occur in reverse.

The rotation of the upper drag brace 12 and projection 14 in a clockwise direction will begin to rotate the upper hook 16 in a counter clockwise direction. This in turn will translate force to the linkage rod 34 downwards, towards the lower hook 18 which in turn will force the lower hook 18 to rotate in a clockwise direction. Clockwise rotation of the lower hook 18 will force the door rod 24 down towards the doors and will therefore apply a force on the doors that will open them. At this stage the landing gear bay doors will be open and the landing gear continues to extend, as shown in FIG. 6.

As the landing gear continues to extend the projection will move out of the range of the upper hook 16 and will no longer be in contact with it. At this point the position illustrated in FIG. 3 is reached and is the same as that described above with reference to FIG. 3.

With the continual extension of the landing gear, the projection 14 will eventually come into contact with the lower hook 18. When the projection 14 connects with the lower hook 18 the clockwise rotation of the upper drag brace 12 and projection 14 will force the lower hook 18 to rotate in a counter clockwise direction. This action will release the force applied to the door rod 24 and will therefore release the load applied to the door and the door will close. At this point the landing gear is in its fully extended position and the landing gear door is closed, as shown in FIG. 5.

As stated above, existing landing gear may be retrofitted to include the double hook door mechanism of the present invention. It will be understood that in order to retrofit existing landing gear it will be necessary to modify the upper brace of the landing gear to include a projection, such as the roller described above, in order for the hooks of the double hook door mechanism to connect with. The placement of the projection will depend on the initial design of the landing gear and the landing gear bay, including the geometry, door to tire timing and the loads and moment arms. A person skilled in the art will be able to calculate the desired position of the projection on the landing gear based on these requirements. It will also be understood that additional modifications may be required within the landing gear bay to ensure that the double hook door mechanism has sufficient space and clearance to operate, as described herein, to open and close the doors.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

Any publications, patents and patent applications referred to herein are incorporated by reference in their entirety to the same extent as if each individual publication, patent or patent application was specifically and individually indicated to be incorporated by reference in its entirety.

The invention claimed is:

1. A landing gear door mechanism for use with an aircraft landing gear, the door mechanism comprising:
   a first connector connected to the aircraft airframe at a first connection point and configured to rotate about the first connection point;
   a second connector, connected to the first connector and to the landing gear door and further connected to the aircraft airframe at a second connection point, the second connector configured to rotate about the second connection point;
   each of the first and second connectors being configured to independently rotate about their relative connection points in opposing directions relative to each other and configured to independently releasably connect with the landing gear, the rotation of the first and second connectors and the releasable connection of each connector to the landing gear providing for the opening and closing of the landing gear door.

2. The landing gear door mechanism according to claim 1, wherein each of the first and second connectors are configured to independently releasably engage with a projection on the landing gear.

3. The landing gear door mechanism according to claim 2, wherein engagement of one of the first or second connectors with the projection, during landing gear retraction and/or extension initiates rotation about the respective connector.

4. The landing gear door mechanism according to claim 1, wherein rotation of the first or second connector translates into rotation of the other connector about its connection point, the simultaneous rotation of the first and second connectors resulting in the opening or closing of the aircraft door.

5. A device for opening and closing an aircraft landing gear bay door, comprising:
   a door rod coupled to the landing gear bay door;
   a first connection means, pivotably coupled to the door rod at a first end and pivotably coupled to the landing gear bay at a first connection point;
   a second connection means, coupled to the first connection means, and pivotably coupled to the landing gear bay at a second connection point;
   the first and second connection means configured to independently releasably connect with a pivot point located on the landing gear.

6. The device according to claim 5, wherein connection of one of the first and second connection means with the pivot point during retraction and extension of the landing gear provides for rotation of the first and second connection means providing for simultaneous movement of the door rod to open or close the bay door.

7. The device according to claim 5, wherein the first and second connection means each include hook means for connecting with the pivot point on the landing gear.

8. The device according to claim 5, wherein the second connection means is coupled to a biasing means that biases the second connection means to rotate in a first direction.

9. A device for opening and closing a landing gear bay door comprising:
   a door rod coupled to the landing gear bay door at a first end;
   a first connector, pivotably coupled to the landing bay at a first connection point;
   a second connector, pivotably coupled to the landing bay at a second connection point and coupled to the door rod at its second end;
   the first and second connectors coupled to each other and configured to simultaneously rotate in opposing directions, the first and second connectors configured to independently engage with a projection located on the landing gear, engagement of one of the first and second connectors with the projection causing rotation of the connectors that translates movement to the door rod to open and close the landing gear bay door.

10. The device according to claim 9, wherein the first and second connectors include hook members that are operable to releasably engage with the projection.

11. The device according to claim 9, wherein the first and second connectors are coupled to each other using a rod.

12. The device according to claim 9, wherein the first connector is biased to pivot about the first connection point in a first direction.

13. The device according to claim 12, wherein the first connector is coupled to a spring to bias the rotation of the first connector about the first connection point in a first direction.

* * * * *